CODE CONVERTER

Filed Aug. 28, 1957 2 Sheets-Sheet 1

INVENTOR.
JOHN A. Mc LAUGHLIN

BY Richard E. Cummins

ATTORNEY

United States Patent Office 2,973,511

Patented Feb. 28, 1961

2,973,511

CODE CONVERTER

John A. McLaughlin, Los Gatos, Calif., assignor to International Business Machines Corporation, New York, N.Y., a corporation of New York Filed Aug. 28, 1957, Ser. No. 680,738

4 Claims. (Cl. 340—347)

This invention relates in general to code conversion systems and in particular to a system for converting a signal comprising a predetermined number of binary bits arranged to define a character in a first code to a second signal comprising a larger number of binary bits arranged to define the same character in a second code.

The necessity of converting from one binary code to another arises quite frequently in present day automatic data processing systems. For example, in some data processing systems it is desirable to graphically display the data being processed character by character on the face of a cathode ray tube which usually requires that the signal supplied to the cathode ray tube in timed relation with the sweep signal comprise a relatively large number of bit positions compared to the number of bit positions necessary to process the character through the other units of the system. Other similar situations also arise.

The present invention provides a relatively simple and inexpensive system for converting a first coded signal into a second longer signal. Generally, the system comprises a counter which is initially set in accordance with the character being converted and thereafter operated by clock pulses which are in timed relationship with the bit positions of a prerecorded master signal. By presenting the prerecorded signal continuously to a sampling circuit controlled by a signal generated in response to a preselected condition of the counter, the prerecorded signal is sampled at equal time intervals, the lengths of which are determined by the time required for the counter to cycle. Thus, if the bits which define the character in the second code are prerecorded at equally spaced intervals corresponding to the counter cycle time, the output of the sampling circuit provides a signal corresponding to the character in the second code.

It is therefore an object of the present invention to provide an improved signal converter.

Another object of the present invention is to provide a system for converting signals representing characters of one code into signals representing corresponding characters of another code.

A further object of the present invention is to provide a signal converter wherein a prerecorded signal having a predetermined characteristic is sampled at times determined by a counter.

Other objects of the invention will be pointed out in the following description and claims and illustrated in the accompanying drawings which disclose, by way of example, the principle of the invention and the best mode which has been contemplated of applying that principle.

Figure 2:
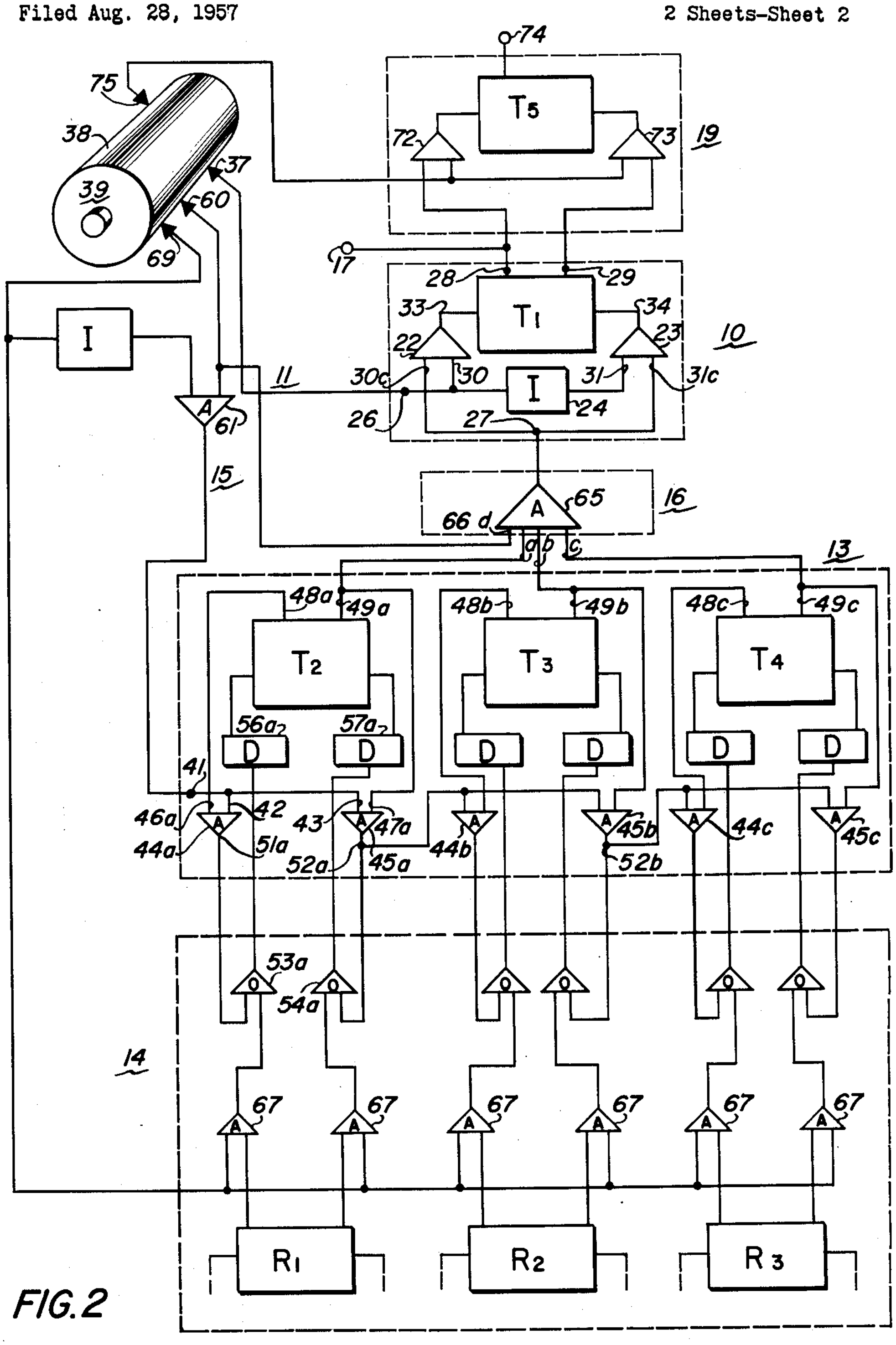
Fig. 2 is a schematic view illustrating a conversion system embodying the present invention.

Referring to the drawing and particularly to Fig. 2, the system illustrated therein comprises generally sampling means 10, means 11 for presenting a master signal having a pulse sequence determined by the longer code to the sampling means, counting means 13, means 14 for applying a signal to the counting means representative of the character to be converted, means 15 for operating the counter in timed relationship with the master signal, and means 16 responsive to a predetermined condition of the counting means for generating a control signal to operate the sampling means 10 and cause its output circuit 17 to assume the current value of the master signal. Additionally, phasing means 19 may also be provided for causing the signals representing the converted characters to have the same phase relationship.

More specifically, the sampling means 10, as shown, comprises a trigger $T_1$, a pair of "and" gates 22 and 23 and an inverter 24, each of which is represented in block form since their construction and operation are well known. Sampling means 10 is further provided with a pair of input terminals 26 and 27 and a pair of output terminals 28 and 29.

The master signal representing the second code is applied to terminal 26 which is connected directly to input tap 30 of "and" gate 22 and indirectly to input tap 31 and "and" gate 23 through inverter 24. The signal which controls the sampling operation is applied to input terminal 27 which is connected directly to the other input taps 30*c* and 31*c* of "and" gates 22 and 23, respectively. The master signal is therefore presented as one input to "and" gate 22 and the complement of the master signal is presented as one input to "and" gate 23. The output taps 33 and 34 of "and" gates 22 and 23 are connected to the grid inputs of trigger $T_1$ and thus determined the state of the trigger. Output terminal 28 of trigger $T_1$ therefore assumes the value of the signal applied to terminal 26 at the time a control signal is applied to terminal 27.

Figure 3:
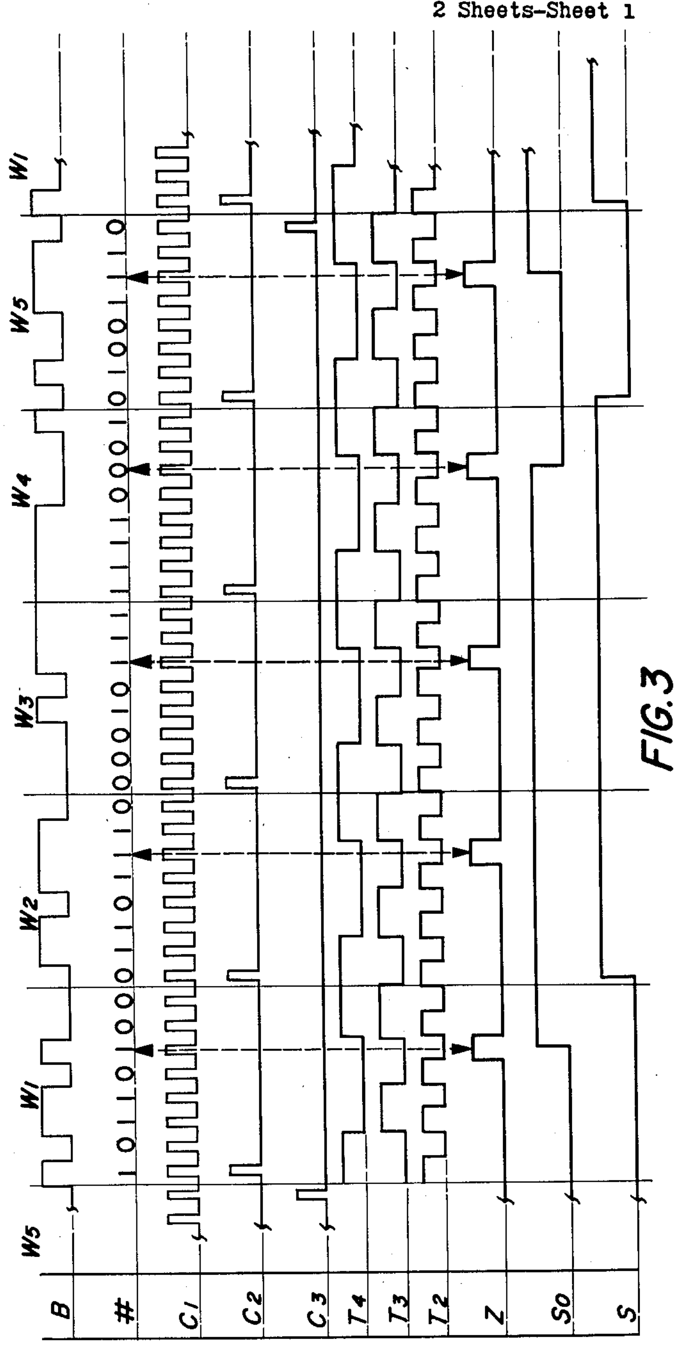
Fig. 3 is a timing chart showing voltage conditions existing at different points in the converter at various times during a conversion operation.

The means 11 for presenting the prearranged master signal to terminal 26 comprises, as shown, a transducer 37 disposed adjacent a magnetic recording surface 38 which is formed on a drum 39 mounted for rotation on an axis by suitable means (not shown). The master signal representing the second code, shown in Fig. 1 as code B, is recorded on surface 38 and is shown in the timing chart of Fig. 3 as signal B. By comparing code B as set forth in Fig. 1 with signal B as shown in Fig. 3, it will be seen that signal B corresponds to code B presented serially by column from top to bottom and left to right. In other words, signal B may be considered to comprise a plurality of code words, W1 through W5, corresponding to the number of bit positions per character of the code B with each code word W comprising a plurality of bit positions corresponding to the number of different characters to be converted. The phrase "presented serially by bit position and character sequence" is used hereafter in the specification and in the claims to define the characteristic of signal B explained above.

By rotating drum 39, signal B may be continuously supplied to the sampling means 10 at some predetermined pulse rate determined by the speed of rotation of drum 39. It should be noted here that other suitable signal producing means may also be employed if desired, the transducer 37 and drum 39 being shown merely for purposes of explanation.

The control signal Z applied to input terminal 27 is generated by means 16 in response to a predetermined condition of the counting means 13. As shown, counting means 13 comprises a plurality of triggers $T_2$ through $T_4$ which are represented in block form since they are conventional triggers arranged to form a conventional binary counter capable of representing 8 different characters in accordance with signals applied to input terminal 41. As shown, the stages of the counter are similar, so only one is described. Each stage comprises a trigger, a pair of "and" gates and a pair of delay circuits. Input terminal 41 is associated with the leftmost stage of the counter and is connected directly to input taps 42 and 43 of "and" gates 44*a* and 45*a*, respectively, whose other input taps 46*a* and 47*a* are connected to output terminals 48*a* and 49*a* of the trigger $T_2$. In the following discussion the elements associated with the first stage trigger $T_2$ are identified by the letter "*a*" following the number, i.e., 45*a*; the elements associated with the second trigger $T_3$ are identified by the letter "*b*" following the number, and the elements associated with the third trigger $T_4$ are identified by the letter "*c*" following the number. Output taps 51*a* and 52*a* of the "and" gates 44*a* and 45*a*, are connected to the grids of trigger $T_2$ through "or" gates 53*a* and 54*a* and delay circuits 56*a* and 57*a*. Output tap 52*a* of "and" gate 45*a* is also connected to "and" gates 44*b* and 45*b*. A pulse applied to terminal 41, therefore, is applied to "and" gates 44*b* and 45*b* whenever the right hand terminal 49*a* of trigger $T_2$ is high. The output terminal 52*b* of "and" gate 45*b* is connected to "and" gates 44*c* and 45*c* which causes signals to be applied thereto in a manner similar to that just described.

Figure 1:
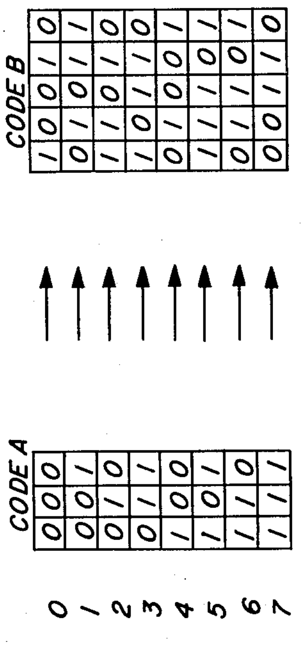
Fig. 1 is a table showing two sets of simple codes which are employed in the description of the operation of the present invention.

The operation of the counting means may be readily explained if it is assumed that trigger $T_2$ represents the lowest order of the counter and corresponds to the right hand column of code A in Fig. 1, and $T_3$ represents the next order and corresponds to the middle column, and that $T_4$ represents the highest order and corresponds to the leftmost column of code A. Therefore, the number six, for example, is represented in the counter when the terminal 48*a* of the lowest order trigger $T_2$ is low and the right hand terminals 49*b* and 49*c* of the second and highest order triggers $T_3$ and $T_4$, respectively, are high. A pulse applied to terminal 41 passes through "and" gate 45*a*, causing $T_2$ to change states. The pulse is also applied to the left hand grid of $T_3$ through "and" gate 44*b*, causing $T_3$ to change states also. The pulse applied to terminal 41 does not effect trigger $T_4$ in this instance since "and" gate 45*b* is closed.

The condition of counting means 13 after a pulse is applied, therefore, represents 101 which corresponds to the binary representation of the character 5 in code A. It will thus be seen that the pulse applied to terminal 41 causes the counter to count down rather than up and may therefore be considered to operate in the reverse sense when compared to the normal operation of a binary counter. The output taps 51*a* and 52*a* of the "and" gates 44*a* and 45*a*, as shown, are connected to the respective triggers through "or" gates 53*a* and 54*a* which also provide input terminals for entering a character to be converted into the triggers $T_2$ through $T_4$. It will be obvious to those skilled in the art that output taps 51*a* and 52*a* of "and" gates 44*a* and 45*a* could be connected directly to the delay circuits 56*a* and 57*a* if a different arrangement is employed for entering a character into the counting means 13.

The means for supplying clock pulses to the counter to cause it to count down in timed relationship with the master signal preferably comprises a transducer 60 positioned adjacent to surface 38 which is provided with a clock track. The transducer is connected to input terminal 41 of the counter through an "and" gate 61, the function of which is explained later on in the specification. However, if it is assumed temporarily that "and" gate 61 is opened, rotation of drum 39 will cause a clock pulse signal represented as signal $C_1$ in Fig. 3 to be applied to terminal 41 in timed relationship with signal B. Since code words W of the master signal have the same number of bits as conditions of the counter, the counter passes through a number of cycles, in this instance five, each time the complete master signal is read.

As stated previously, the control signal Z in Fig. 3 is generated by means 16 responsive to a predetermined condition of the counting means 13. In the preferred embodiment illustrated, means 16 comprises a simple "and" gate 65 provided with three input terminals 66*a*, 66*b* and 66*c*, connected to the output terminals 49*a*, 49*b* and 49*c*, of triggers $T_2$, $T_3$ and $T_4$, respectively. An additional input terminal 66*d* connected to the source of $C_1$ clock pulses is also provided to control more accurately the time that signal Z is operative. Control signal Z is therefore applied to terminal 27 from the output of "and" gate 65 when the counter reaches a zero count condition, i.e., when the terminals 49*a*, 49*b* and 49*c* are all high. Control signal Z therefore occurs once during each cycle of the counter and the master signal is sampled at equally spaced times determined by the counter cycle time. By entering the character to be converted into the triggers $T_2$, $T_3$ and $T_4$ just prior to the time that the start of the master signal is applied to terminal 26 of sampling means 10, the counter will count down in timed relationship with the master signal until a zero condition is reached, at which time the appropriate bit of the first code word W1 will be sampled and the output signal at terminal 17 will correspond to the value of that bit. Thereafter the counter cycles, and each time it reaches a zero count condition, the same bit position in each of the code words W is sampled by the Z signal, which causes the output signals $S_o$ at terminal 17 to represent the corresponding character in the code B.

The above operation may be readily seen by the reference to Fig. 3 which illustrates the character 5 in the first code A being converted to the second code B. As shown, counting means 13 is initially set to a 5 count condition represented binarily as 101 and corresponding to the sixth character position in the chart of code A in Fig. 1. $C_1$ clock pulses are supplied to the terminal 41 of the counting means in timed relationship with signal B supplied to terminal 26 of the sampling means 10. After six clock pulses the counter has reached a zero count condition, causing signal Z to be generated by means 16 which result in the sampling of the sixth bit of the first word $W_1$ of signal B. The output signal $S_O$ of the sampling means 10 therefore assumes the present value of the sampled signal until the next bit is sampled. The sixth bit position of each code word $W_2$ through $W_5$ of signal B is sampled in a corresponding manner. The output signal $S_O$ therefore represents character 5 in the second code.

The initial entry of the character to be converted into the counter may be obtained by any of the various well known arrangements, one such arrangement being shown in Fig. 2, which includes a register having "flip-flops" $R_1$, $R_2$ and $R_3$ whose outputs are connected to the triggers $T_2$, $T_3$ and $T_4$ of the counting means 13 through "and" gates 67 and "or" gates 53 and 54. A $C_3$ clock pulse supplied to "and" gates 67 by means of a transducer 69 immediately prior to the start of the master signal transfers the contents of the register's "flip-flops" $R_1$, $R_2$ and $R_3$ to the counting means 13. The $C_3$ clock pulse also prevents the counting means from operating during the character transfer time by applying an inverted $C_3$ pulse to "and" gate 61.

The phasing of the $S_O$ signal representing characters in the second code is dependent on the particular character converted. If it is desired to provide a signal whose phasing is independent of the character, phasing means 19 comprising a trigger $T_5$ and "and" gates 72 and 73 may be provided as shown in Fig. 2. The output terminal 74 of trigger $T_5$ provides a signal S (Fig. 3) corresponding to signal $S_O$ but shifted in phase to the start of the second code word $W_2$ of signal B. The shifting is accomplished by providing a $C_2$ clock pulse signal from transducer 75 to "and" gates 72 and 73 at the start of each of the code words $W_1$ through $W_5$ in signal B. The phasing of signal S is therefore independent of the character being converted.

While in the illustrated embodiment a three bit character was converted to a five bit character, it will be apparent that conversion to larger code may be achieved in a similar manner by merely providing additional stages in the counter circuits and associate circuit elements. It should further be noted that the character in the second code may be defined by any arrangement of binary bits, zero, and one, without regard to the arrangement of the bits in the first code.

While there have been shown and described and pointed out the fundamental novel features of the invention as applied to the preferred embodiment, it will be understood that various omissions and substitutions and changes in the form and details of the system illustrated and in its operation may be made by those skilled in the art, without departing from the spirit of the invention. It is the intension, therefore, to be limited only as indicated by the scope of the following claims.

What is claimed is:

1. A system for converting binary coded signals representing characters in a first code into longer binary coded signals representing corresponding characters in a second code, said system comprising means operable to generate a master signal containing all the bits employed to define the characters in said second code arranged serially by bit position and character sequence, controllable means for sampling said master signal to provide an output signal corresponding to the character being converted, a binary counter having a cycle time which is a sub-multiple of the master signal cycle time, means for setting said counter to a first count condition representative of a character to be converted, means for operating said counter in timed relationship with said master signal, and means responsive to a predetermined count condition of said counter for generating a control signal to cause operation of said sampling means.

2. A system for converting a character from one code wherein the characters are defined by a fixed number of bits to a second code wherein the characters are defined by a larger number of bits, said system comprising means operable to generate a master signal containing all the bits of the characters of said second code arranged serially by bit positions and character sequence so that the bits associated with respective characters in said second code are spaced equally in said master signal controllable means for sampling said master signal, counting means, means for establishing a count condition in said counting means corresponding to a character to be converted, means for changing said count condition in timed relation with said master signal, and means operable in response to a preselected count condition for generating a control signal to cause operation of said sampling means resulting in the output signal thereof assuming the current valve of the sampled signal.

3. The system recited in claim 2 including phasing means operable to render the phase of said output signal independent of the character being converted.

4. The invention set forth in claim 3 wherein said phasing means includes a trigger and means for operating said trigger to provide a signal corresponding to said output signal but shifted in phase an amount determined by the character being converted.

References Cited in the file of this patent

UNITED STATES PATENTS

| | | |
|---|---|---|
| 2,540,654 | Cohen et al. | Feb. 6, 1951 |
| 2,717,987 | Hagen | Sept. 13, 1955 |
| 2,733,358 | Carapellotti | Jan. 31, 1956 |
| 2,787,418 | MacKnight | Apr. 2, 1957 |
| 2,858,530 | Kohs | Oct. 28, 1958 |